(12) United States Patent
Unal et al.

(10) Patent No.: US 7,787,678 B2
(45) Date of Patent: Aug. 31, 2010

(54) DEVICES, SYSTEMS, AND METHODS FOR PROCESSING IMAGES

(75) Inventors: Gozde Unal, West Windsor, NJ (US); Gregory G. Slabaugh, Princeton, NJ (US); Tong Fang, Morganville, NJ (US)

(73) Assignee: Siemens Corporation, Iselin, NJ (US)

( * ) Notice: Subject to any disclaimer, the term of this patent is extended or adjusted under 35 U.S.C. 154(b) by 1000 days.

(21) Appl. No.: 11/538,921

(22) Filed: Oct. 5, 2006

(65) Prior Publication Data
US 2007/0265813 A1 Nov. 15, 2007

Related U.S. Application Data

(60) Provisional application No. 60/724,396, filed on Oct. 7, 2005.

(51) Int. Cl.
*G06K 9/00* (2006.01)
*G06F 7/60* (2006.01)

(52) U.S. Cl. ............................ 382/128; 703/2

(58) Field of Classification Search .................. 382/128
See application file for complete search history.

(56) References Cited

U.S. PATENT DOCUMENTS

| | | | |
|---|---|---|---|
| 6,201,543 B1 | 3/2001 | O'Donnell | |
| 6,785,409 B1 * | 8/2004 | Suri | ............................ 382/128 |
| 6,912,310 B1 | 6/2005 | Park | |
| 2003/0053667 A1 | 3/2003 | Paragios | |
| 2003/0207250 A1 * | 11/2003 | Kaufman et al. | ................ 435/4 |
| 2003/0214537 A1 | 11/2003 | Lynn | |
| 2003/0223620 A1 | 12/2003 | Anxionnaz | |
| 2004/0146199 A1 * | 7/2004 | Berkner et al. | ............... 382/176 |
| 2005/0195189 A1 * | 9/2005 | Raman et al. | ................ 345/424 |

OTHER PUBLICATIONS

Feng Gui; Lin Qi Wei; , "Application of variogram function in image analysis," Signal Processing, 2004. Proceedings. ICSP '04. 2004 7th International Conference on , vol. 2, No., pp. 1099-1102 vol. 2, Aug. 31-Sep. 4, 2004 URL: http://ieeexplore.ieee.org/stamp/stamp.jsp?tp=&arnumber=1441515&isnumber=30994.*

Likar, B.; Viergever, M.A.; Pernus, F.; , "Retrospective correction of MR intensity inhomogeneity by information minimization," Medical Imaging, IEEE Transactions on , vol. 20, No. 12, pp. 1398-1410, Dec. 2001 URL: http://ieeexplore.ieee.org/stamp/stamp.jsp?tp=&arnumber=974934&isnumber=21028.*

* cited by examiner

*Primary Examiner*—Charles Kim
*Assistant Examiner*—Nirav G Patel

(57) ABSTRACT

Certain exemplary embodiments can comprise a method, which can comprise, automatically determining a target object from an image via an application of an iterative minimization algorithm to an energy function. Each iteration of the iterative minimization algorithm can comprise a comparison of a model with an estimated contour of the target object.

20 Claims, 18 Drawing Sheets

DEVICES, SYSTEMS, AND METHODS FOR PROCESSING IMAGES

CROSS-REFERENCES TO RELATED APPLICATIONS

This application claims priority to, and incorporates by reference herein in its entirety, pending U.S. Provisional Patent Application Ser. No. 60/724,396, filed 7 Oct. 2005.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments comprise a method, which can comprise, automatically determining a target object from an image via an application of an iterative minimization algorithm to an energy function. Each iteration of the iterative minimization algorithm can comprise a comparison of a model with an estimated contour of the target object.

Figure 1:
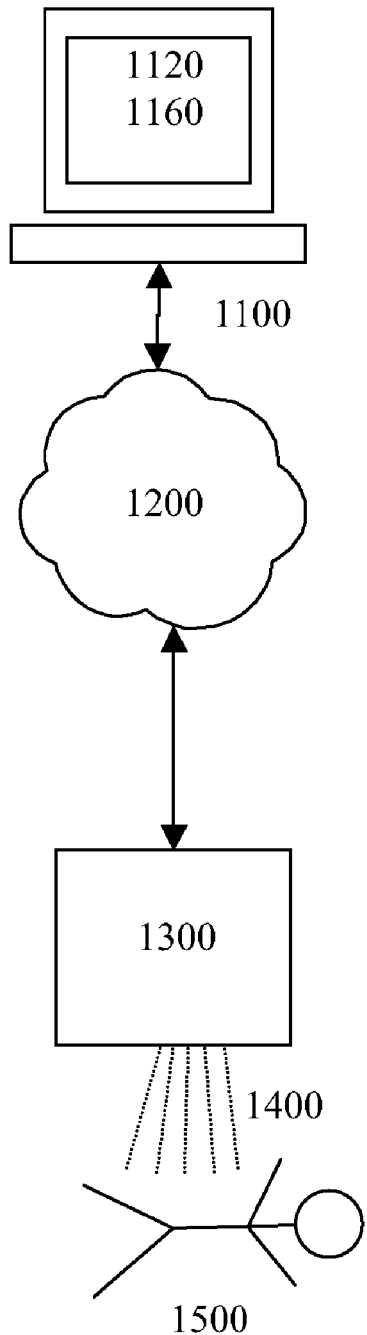
FIG. 1 is a block diagram of an exemplary embodiment of a system 1000.

FIG. 1 is a block diagram of an exemplary embodiment of a system 1000, which can comprise a means for imaging, such as an imaging device 1300. Imaging device 1300 can be any device adapted to provide an image, such as an image of a patient 1500. For example, imaging device 1300 can be a magnetic resonance (MR) imaging device, an X-ray imaging device, and/or a computed tomography (CT). Imaging data can be obtained regarding patient 1500, such as via imaging device 1300, a device communicatively coupled thereto, and/or an independent detector, utilizing reflected and/or absorbed emissions 1400 from imaging device 1300.

Imaging device 1300 and/or an independent detector can be communicatively coupled to an information device 1100 directly and/or via a network 120. Information device 1110 can comprise a user program 1160, which can be adapted to analyze, process, manage, and/or improve image data from imaging device 1300. Information device 1100 can comprise a user interface 1120, which can be adapted to render image information associated with imaging device 1300.

Figure 2:
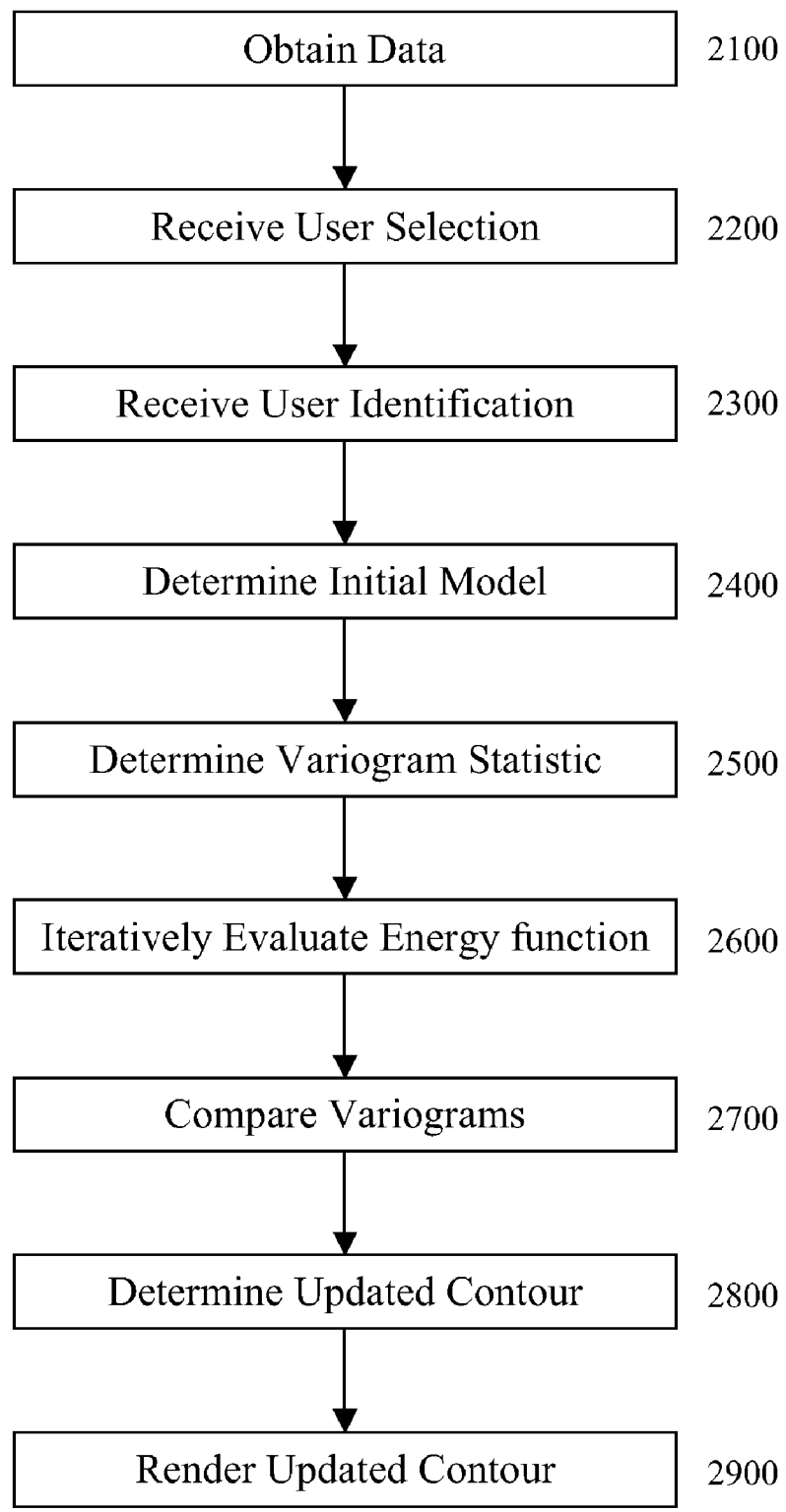
FIG. 2 is a flowchart of an exemplary embodiment of a method 2000.

FIG. 2 is a flowchart of an exemplary embodiment of a method 2000. At activity 2100, data can be obtained from an imaging device, such as a magnetic resonance image device, or any type of image stored in a computer medium, at a means for processing data, such as an information device and/or a processor.

At activity 2200, a user selection can be received regarding an image of an object. For example, an initial image based upon the data can be rendered and a user selection, of an approximate center point of a target object and/or structure comprised by the initial image, can be received. The image can be a two dimensional image or a three dimensional image. The image can be a medical image obtained from a patient.

At activity 2300, a user identification of the image of the object can be received. The user can provide an identity of the target structure. For example, the user can identify one or more target objects, which can be, for example, a lymph node, pancreas, heart, lung, cerebellum, kidney, liver, thyroid, intestine, adrenal, prostate, pituitary, cortex, subcortical region, brainstem, olfactory bulb, spinal cord, vertebrae, eye, urinary bladder, testis, and/or ovary, etc.

At activity 2400, an initial object model and/or mathematical representation of the target object can be determined. The initial object model and/or mathematical representation can be based upon the data obtained from the imaging device and/or the user selection and/or identification of the target object. The initial object model and/or mathematical representation can comprise an initial contour of the target object. The initial contour can be determined based upon the selection of the object model. The initial object model can be utilized as a first prior object model in an iterative imaging method. The initial object model can be a mathematical model of a geometric shape. For example, the initial shape of a lymph node might be an ellipse. As another example, the initial shape of a thyroid might be a complex polygon. As another example, a vertebra might be modeled as a rectangle. The initial mathematical representation of the target object can comprise an initial contour. The initial contour can be based upon the approximate central point of the target object.

Certain exemplary embodiments can comprise two models: a geometric object model (e.g., an ellipse), and an image intensity model incorporated via a variogram. In certain exemplary embodiments, a development of the initial image intensity model can involve a learning process. When many samples of images with a target structure exist, certain exemplary embodiments can experimentally look at different spatial statistical measures, either a relatively simple measure, a full variogram, and/or others, and then come up with a model $\gamma^{*(h)}$ as an initial model.

Certain exemplary embodiments can comprise two models for intensity characteristics: a general (anisotropic) variogram case; and a mean-based (isotropic) version.

At activity 2500, a variogram statistic of the target object can be determined. In certain exemplary embodiments, one or more model variograms can be determined. For example, the variogram statistic can be determined according to an equation:

$$\gamma(h) = \frac{\int_{C^{r,\theta}} (I(X) - I(X+h))^2 dp}{\int_{C^{r,\theta}} dp}$$

where:

γ is the variogram statistic;

h is a direction vector;

$C^{r,\theta}$ is the contour associated with the prior variogram model;

r is a specific band radius related to the contour;

θ is a direction of vector h;

X is an image coordinate vector;

p is a coordinate variable on the contour; and

I is a measured image intensity at a specified location.

At activity 2600, an energy function can be iteratively evaluated. The energy function can be based upon a variogram statistic calculated from image data for instance obtained from an imaging device, such as a magnetic resonance imaging device. In certain exemplary embodiments, the energy function can be expressed as:

$$E(\lambda) = \alpha_1 \int_0^{2\pi} \int_0^R \left[ \frac{\int_{\epsilon^{r,\theta}} (I(X) - I(X+h))^2 dp}{\int_{\epsilon^{r,\theta}} dp} - \gamma^*(h) \right]^2 dr d\theta + \alpha_2 \int_{\epsilon_{in}} f(X) dX$$

where:

E(λ) is the energy function;

λ is a parameter of at least one of a prior geometric model;

$\alpha_1$, and $\alpha_2$ are assigned weights;

R is a maximum distance over which the energy function is evaluated, which is related to the contour;

$\gamma^{*(h)}$ is a model variogram statistic at a selected point at a point on the contour;

h is a direction vector;

r is a specific band radius related to the contour;

θ is a direction of vector h;

X is an image coordinate vector;

p is a coordinate variable on the contour;

I is a measured image intensity at a specified location;

ε is the contour having parameters λ;

ƒ(χ) is a region descriptor; and $\epsilon_{in}$ is a region inside of the contour.

The energy function can comprise accumulations of data terms at different contour band sections with radius r and angle θ. For a free form contour, certain exemplary embodiments can obtain these bands as follows. Take a current contour C, then erode the contour C by constant steps, e.g. by 1, and take a certain angular section from [0, 2 pi], and obtain a new contour C1, then continue eroding in this fashion to obtain a sequence of shrinking contours $C_1, \ldots, C_N$. Such a method can create the set of contours on which the energy function operates. The target object contour can be determined via an application of the iterative minimization algorithm to the energy function.

The estimated contour of the updated model can be determined via a derivative of the energy function evaluated at the contour of the prior model of the object. The estimated variogram can be determined via a derivative of the energy function evaluated at a contour associated with a prior variogram model of the target object. Certain exemplary embodiments can evaluate a derivative of the energy function. The tangents can be determined based upon the derivative of the energy function. If the model of the target structure is a parameterized contour, the contour can be traced along the parameter and the energy derivative terms can be evaluated on each contour point. Certain exemplary embodiments can be adapted to determine a mean image intensity of a portion of the target object. The iterative minimization algorithm can be adapted to utilize the mean image intensity. Evaluating the updated contour can comprise comparing image intensity values along the updated contour of the target object to a mean image intensity of a portion of the target object. Tangents and normals can be determined from the contour derivatives along horizontal and/or vertical directions on a transversal image plane, and along the third direction in the longitudinal plane for an exemplary three dimensional image volume. In an attempt to minimize the energy function, Euler-Lagrange equations for the energy can lead to a differential equation of the energy function that, when equal to zero, minimizes the energy function. In certain exemplary embodiments, the derivative of the energy function can be expressed as:

$$\frac{\partial \lambda^j}{\partial t} = \int_0^{2\pi} \int_0^R (\gamma(h) - \gamma^*(h))$$

$$\left[ \frac{\int_{\epsilon^h} \left\langle 2(I(x) - I(x+h))(\nabla I(x) - \nabla I(x+h)), \frac{\partial x}{\partial \lambda^j} \right\rangle dp}{\int_{\epsilon^h} dp} - \gamma(h) \frac{\int_{\epsilon^h} \left\langle \frac{\partial x}{\partial \lambda^j}, T_p \right\rangle dp}{\int_{\epsilon^h} dp} \right] dh +$$

$$\alpha_2 \int_\epsilon f(x,y) \left\langle \frac{\partial x}{\partial \lambda^j}, N \right\rangle dp$$

where:

$\lambda^j$ is a parameter of the contour;

R is a maximum distance over which the energy function is evaluated, which is related to the contour;

γ is the variogram statistic;

h is a direction vector;

$\gamma^{*(h)}$ is a model variogram statistic at a selected point at a point on the contour;

$\epsilon^h$ is a contour at a specific distance band of the contour;

I is a measured image intensity at a specified location;

X is an image coordinate vector;

∇ is a gradient symbol;

p is a coordinate variable on the contour;

$f^{(x, y)}$ is a region descriptor of the contour; and

T(p) is a tangent vector to the contour;

$T_p$ is a derivative of T(p);

$$\left\langle \frac{\partial x}{\partial \lambda^j}, N \right\rangle$$

is an inner product between two vectors, $$\frac{\partial x}{\partial \lambda}$$

and N; and

N is a unit normal vector of the contour.

At activity 2700, variograms can be compared. Each iteration of the iterative minimization algorithm can comprise a comparison of variogram model of the object to an estimated variogram associated with the updated contour of the target object.

At activity 2800, an updated contour can be determined based on the initial contour. The updated contour is determined based upon the energy function and/or the image intensities along the contour. The updated contour can be determined based upon an application of an iterative minimization algorithm to the energy function. The energy function can be based upon a variogram statistic calculated from data of the medical image of the patient. In certain exemplary embodiments, a determination can be made that the minimization algorithm has completed.

At activity 2900, the resulting contour and/or an image associated therewith can be rendered.

Certain exemplary embodiments can be adapted to delineate target regions from images, such as anatomic structures in Magnetic Resonance (MR) images. Certain exemplary embodiments can delineate the target regions in a relatively robust manner with relatively little user interaction. An input to certain exemplary embodiments can comprise a mouse click somewhere around a center of a target structure. Such a mouse click can trigger a contour propagation based on spatial statistics of image data. Certain exemplary embodiments can be adapted to utilize spatial statistics in contour propagation for an image and/or image model. A particular form of a utilized spatial statistic can be a variogram.

In spatial statistics, a variogram can be adapted to quantify one or more spatial correlations. The variogram can be adapted to measure dissimilarity as a function of separation distance and/or direction. In certain exemplary embodiments, the variogram statistic and/or also a simplified version of the variogram can be adapted to propagate contours in delineating target regions from images.

Certain exemplary embodiments can comprise an active contour propagation adapted for image modeling and/or segmentation of desired structures from images. Certain exemplary embodiments can utilize a spatial statistic, such as the variogram, for image modeling and/or segmentation of desired structures from images.

When anatomic structures such as lymph nodes, tumors and so on show heterogeneity inside their borders, a corresponding variogram can change more rapidly in one direction than in another. Such a condition can be referred to as anisotropy in the variogram.

A general variogram-flow can be based on the variogram statistic, which can be defined as:

$$\gamma(h) = \frac{\int_{C^{r,\theta}} (I(X) - I(X+h))^2 dp}{\int_{C^{r,\theta}} dp} \quad (1)$$

where I is an image intensity at location X, (X=(x, y) in 2D and X=(x, y, z) in 3D), and I(x+h) is the image intensity obtained at a location x translated by h. $C^{r,\theta}$ represents a contour with a specific band radius r and θ hence representing a direction vector h, p denotes a uniform parameter around the contour $C^{r,\theta}$, and x is an image coordinate vector (here used interchangeably with p, which is intuitively a coordinate variable on the contour). In certain exemplary embodiments, h and (r, θ) can be used interchangeably since h is the direction vector (here for simplicity a two dimensional vector, however, in case of a three dimensional image, h can be a three dimensional direction vector that can be represented with an additional rotation variable, such as φ).

A least squares fit can be assumed for a measure of "how well" a theoretical model fits image data. In certain exemplary embodiments γ* can denote a model spatial statistic obtained by prior knowledge or training on the data, and R can denote a distance over which the spatial statistic is calculated, then:

$$\int_0^{2\pi} \int_0^R [\gamma(h) - \gamma^*(h)]^2 dh. \quad (2)$$

For certain exemplary images, a contour can be defined as $C(t) = \epsilon(t)$, which can be an ellipse with parameters $\lambda^j$. In certain exemplary embodiments, the contour representation can be as general as desired, such as a polygon or an implicit contour. An exemplary overall energy of the contour comprising a spatial statistical term can be expressed as:

$$E(\lambda) = \alpha_1 \int_0^{2\pi} \int_0^R \left[ \frac{\int_{\epsilon^{r,\theta}} (I(X) - I(X+h))^2 dp}{\int_{\epsilon^{r,\theta}} dp} - \gamma^*(h) \right]^2 dr d\theta + \alpha_2 \int_{\epsilon_{in}} f(X) dX \quad (3)$$

where the maximum distance R can be taken as a factor of the maximum radius of the current ellipse $R_\epsilon$, e.g. $R=1.5*R_\epsilon$. The function $f$ in the second term represents a region descriptor, such as a piecewise constant mean intensity model. The variables $\alpha_1$, and $\alpha_2$ can be the weights of each term in the energy equation. In an exemplary embodiment with $\alpha_1=1$, $\alpha_2=0$, a an exemplary equation can result with a model-based spatial statistic. The variable $\epsilon_{in}$ represents the region inside the contour ε.

Taking the derivative of this exemplary energy equation with respect to ellipse parameters, a contour propagation equation can be derived as:

$$\frac{\partial \lambda^j}{\partial t} = \alpha_1 \int_0^{2\pi} \int_0^R 2(\gamma(r,\theta) - \gamma^*(r,\theta)) \cdot \quad (4)$$

$$\left[ \frac{\int_{\epsilon^{r,\theta}} \left\langle 2(I(X)-I(X+h))(\nabla I(X) - \nabla I(X+h)), \frac{\partial X}{\partial \lambda^j} \right\rangle dp}{\int_{\epsilon^{r,\theta}} dp} - \frac{\int_{\epsilon^{r,\theta}} (I(X)-I(X+h))^2 dp \int_{\epsilon^{r,\theta}} \left\langle \frac{\partial X}{\partial \lambda^j}, T_p \right\rangle dp}{\left(\int_{\epsilon^{r,\theta}} dp\right)^2} \right] dh + \alpha_2 \int_\epsilon f(x,y) \left\langle \frac{\partial x}{\partial \lambda^j}, N \right\rangle dp$$

where T(P) is a tangent vector and $T_p$ is the derivative of the tangent (which is then in the normal direction of the contour model, such as an ellipse) along the image model.

The variogram flow can also be rewritten as:

$$\frac{\partial \lambda^j}{\partial t} = \int_0^{2\pi} \int_0^R (\gamma(h) - \gamma^*(h)) \tag{5}$$

$$\left[ \frac{\int_{\varepsilon h} \left\{ 2(I(X) - I(X+h))(\nabla I(X) - \nabla I(X+h)), \frac{\partial X}{\partial \lambda^j} \right\} dp}{\int_{\varepsilon h} dp} - \gamma(h) \frac{\int_{\varepsilon h} \left\langle \frac{\partial X}{\partial \lambda^j}, T_p \right\rangle dp}{\int_{\varepsilon h} dp} \right] dh +$$

$$\alpha_2 \int_{\varepsilon} f(x, y) \left\langle \frac{\partial x}{\partial \lambda^j}, N \right\rangle dp.$$

An exemplary region in a transverse relaxation time (T2) weighted magnetic resonance (MR) image is the lymph node that mostly displays a homogeneous regional character. Therefore, an approximate piecewise constancy can be assumed in a spatial intensity model for the lymph node. In certain exemplary embodiments, a lymph node model can be characterized as having isotropy in a corresponding variogram.

In certain exemplary embodiments, a spatial statistic for an isotropic variogram can be expressed as:

$$\gamma(r) = \frac{\int_{C^r} (I(x,y) - I_c)^2 dp}{\int_{C^r} dp} \tag{6}$$

where I is the image intensity, $I_C$ is the image intensity obtained at a center of a contour C (for instance by an averaging in a small ball around the center).

$C^r$ represents the contour with a specific band radius r, p denotes a uniform parameter around the contour $C^r$, and (x, y) are image coordinates (that can be used interchangeably with p, which can be a coordinate variable on the contour).

In certain exemplary embodiments, a least squares fit can be assumed as a measure of how well a theoretical model fits experimental data. Let $\gamma^*$ denote a model spatial statistic obtained by prior knowledge or training on the data, and R denote the distance till which the spatial statistic is calculated, then in certain exemplary embodiments:

$$\int_0^R [\gamma(r) - \gamma^*(r)]^2 dr. \tag{7}$$

In certain exemplary embodiments, let the contour $C(t) = \epsilon(t)$ be the ellipse with parameters $\lambda^j$. However, the contour representation can be as general as desired, such as a polygon or an implicit contour. The overall energy of the contour with a spatial statistical term can be expressed by an equation:

$$E(\lambda) = \tag{8}$$

$$\alpha_1 \int_0^R \left[ \frac{\int_{\varepsilon^r} (I(x,y) - I_c)^2 dp}{\int_{\varepsilon^r} dp} - \gamma^*(r) \right]^2 dr + \alpha_2 \int_{\varepsilon_{iA}} f(x,y) dx dy$$

where the maximum distance R can be taken as a factor of a maximum radius of a current ellipse $R_\epsilon$, e.g. $R = 1.5 * R_\epsilon$. The function $f$ in the second term represents a region descriptor, such as a piecewise constant mean intensity model. Variables $\alpha_1$, and $\alpha_2$ can be weights of each term in the equation. In certain exemplary embodiments, a new equation can be obtained with a model-based spatial statistic where $\alpha_1 = 1$, $\alpha_2 = 0$.

Taking the derivative of the energy equation with respect to ellipse parameters, a contour propagation equation can be obtained as:

$$\frac{\partial \lambda^j}{\partial t} = \alpha_1 \int_0^R 2(\gamma(r) - \gamma^*(r)) \cdot \tag{9}$$

$$\left[ \frac{\int_{\varepsilon^r} \left\{ 2(I(x,y) - I_c) \nabla I(x,y), \frac{\partial X}{\partial \lambda^j} \right\} dp}{\int_{\varepsilon^r} dp} - \frac{\int_{\varepsilon^r} (I(x,y) - I_C)^2 dp \int_{\varepsilon^r} \left\langle \frac{\partial X}{\partial \lambda^j}, T_p \right\rangle dp}{(\int_{\varepsilon^r} dp)^2} \right]$$

$$dr + \alpha_2 \int_{\varepsilon} f(x,y) \left\langle \frac{\partial x}{\partial \lambda^j}, N \right\rangle dp$$

where T(p) is the ellipse tangent vector and $T_p$ is the derivative of the tangent (which is then in the normal direction of the contour model, such as an ellipse) along image model. The spatial statistical term can be written as:

$$\frac{\partial \lambda^j}{\partial t} = \int_0^R (\gamma(r) - \gamma^*(r)) \left[ \frac{\int_{\varepsilon^r} \left\{ 2(I(x,y) - I_c) \nabla I(x,y), \frac{\partial X}{\partial \lambda^j} \right\} dp}{\int_{\varepsilon^r} dp} - \gamma(r) \frac{\int_{\varepsilon^r} \left\langle \frac{\partial X}{\partial \lambda^j}, T_p \right\rangle dp}{\int_{\varepsilon^r} dp} \right] dr. \tag{10}$$

Figure 3:
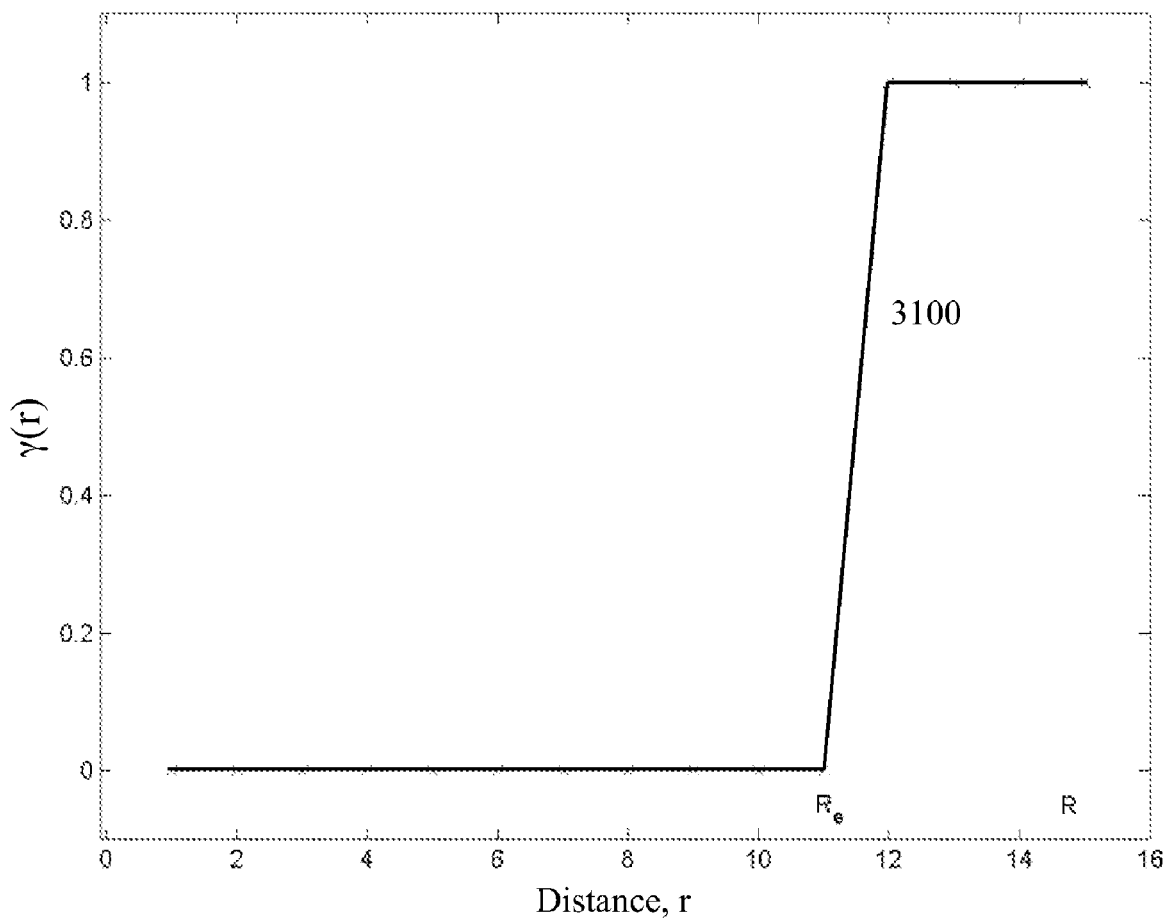
FIG. 3 is an exemplary graph of a spatial statistic.

FIG. 3 is an exemplary graph of a spatial statistic 3100, which can be a piecewise constant ideal region inside and outside a target structure. A model variogram can be of a form of spatial statistic 3100 where $R_e$ denotes the distance at a border of an ellipse, and R denotes a maximum distance that is taken into account outside the ellipse. In certain exemplary embodiments, an ideal $\gamma$ function can be used as a spatial statistical model for identifying target structures with piecewise constant region characteristics.

Figure 4A:
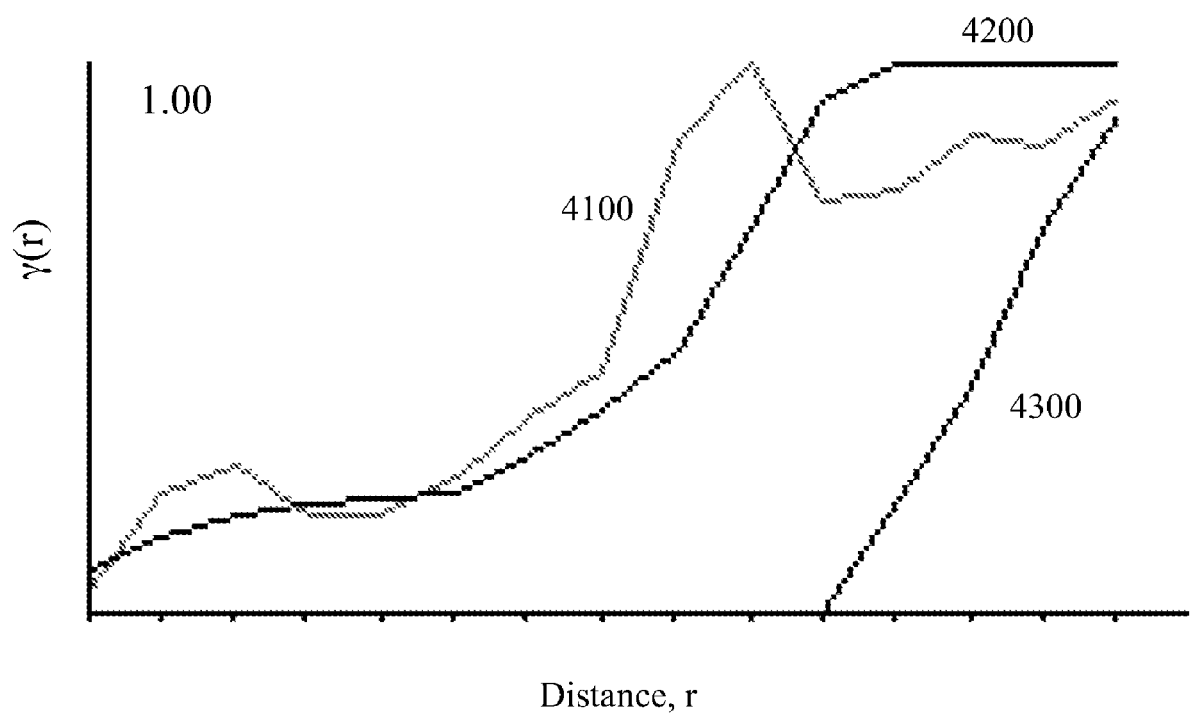
FIG. 4A is an exemplary graph of a spatial statistic.
Figure 4B:
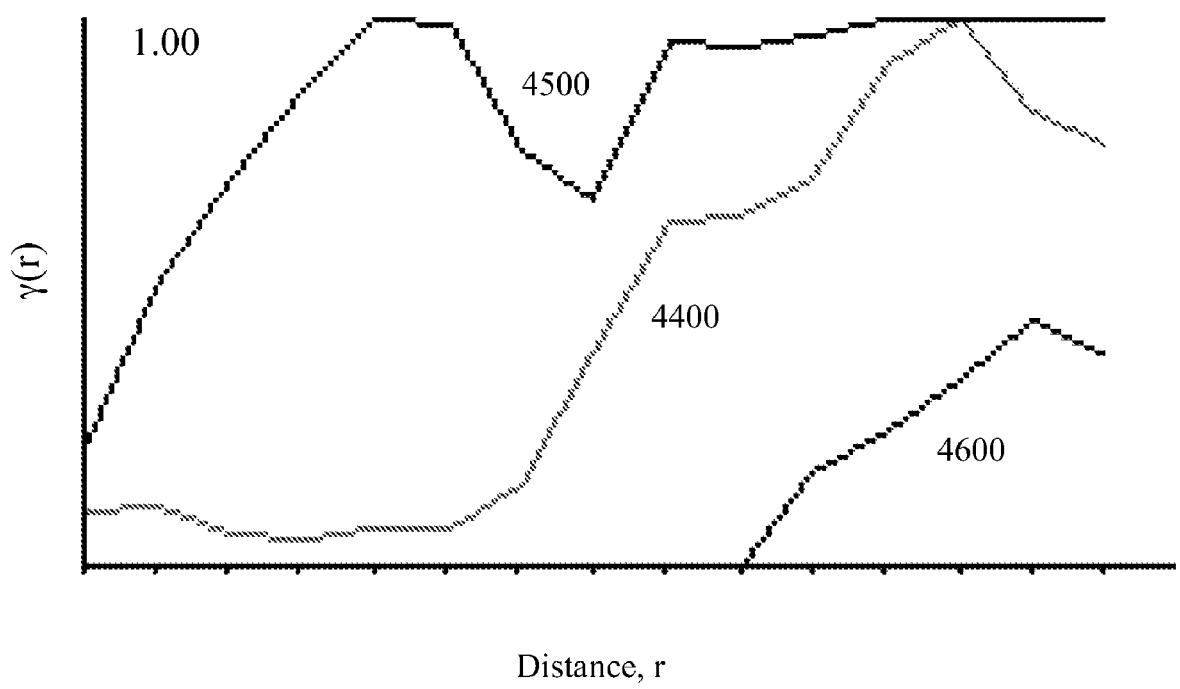
FIG. 4B is an exemplary graph of a spatial statistic.
Figure 4C:
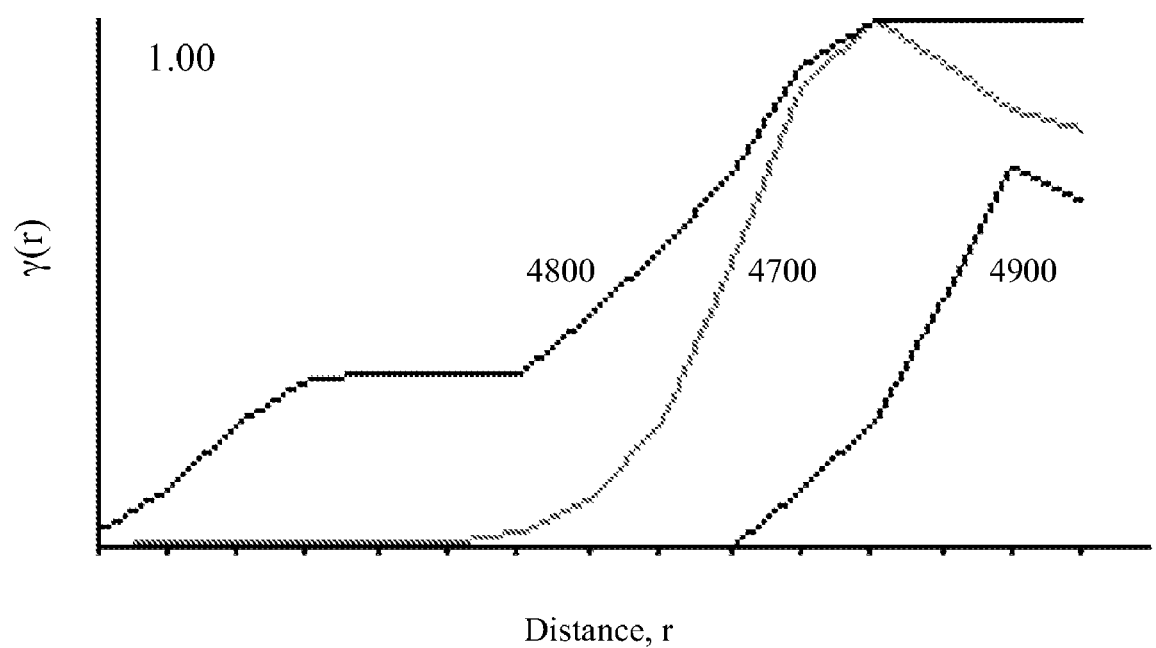
FIG. 4C is an exemplary graph of a spatial statistic.

FIGS. 4A, 4B, and 4C are exemplary graphs of spatial statistics. Each of FIGS. 4A, 4B, and 4C were derived based upon real lymph node images. Each of FIGS. 4A, 4B, and 4C comprise confidence intervals computed from a current database of lymph nodes.

FIG. 4A illustrates a variogram statistic 4100 calculated from an exemplary T2 magnetic resonance image. Each of confidence intervals 4200 and 4300 was determined based upon variogram statistic 4100.

FIG. 4B illustrates a variogram statistic 4400 calculated from an exemplary T2 magnetic resonance image. Each of confidence intervals 4500 and 4600 was determined based upon variogram statistic 4400.

FIG. 4A illustrates a variogram statistic 4100 calculated from an exemplary T2 magnetic resonance image. Each of confidence intervals 4700 and 4800 was determined based upon variogram statistic 4900.

FIGS. 5A, 5B, 5C, 5D, 5E, and 5F, as well as, FIGS. 6A, 6B, 6C, 6D, 6E, and 6F, depict the performance of two simple ellipse evolutions (flows). The simple mean statistic flow (which separates the mean inside and outside the ellipse maximally) when $\alpha_1=0$, $\alpha_2=1$ in equation (9) in FIGS. 5A, 5B, 5C, 5D, 5E, and 5F leads to attraction of the ellipse to nearby structures like vessels because of their similar intensity mean statistic.

Figure 5A:
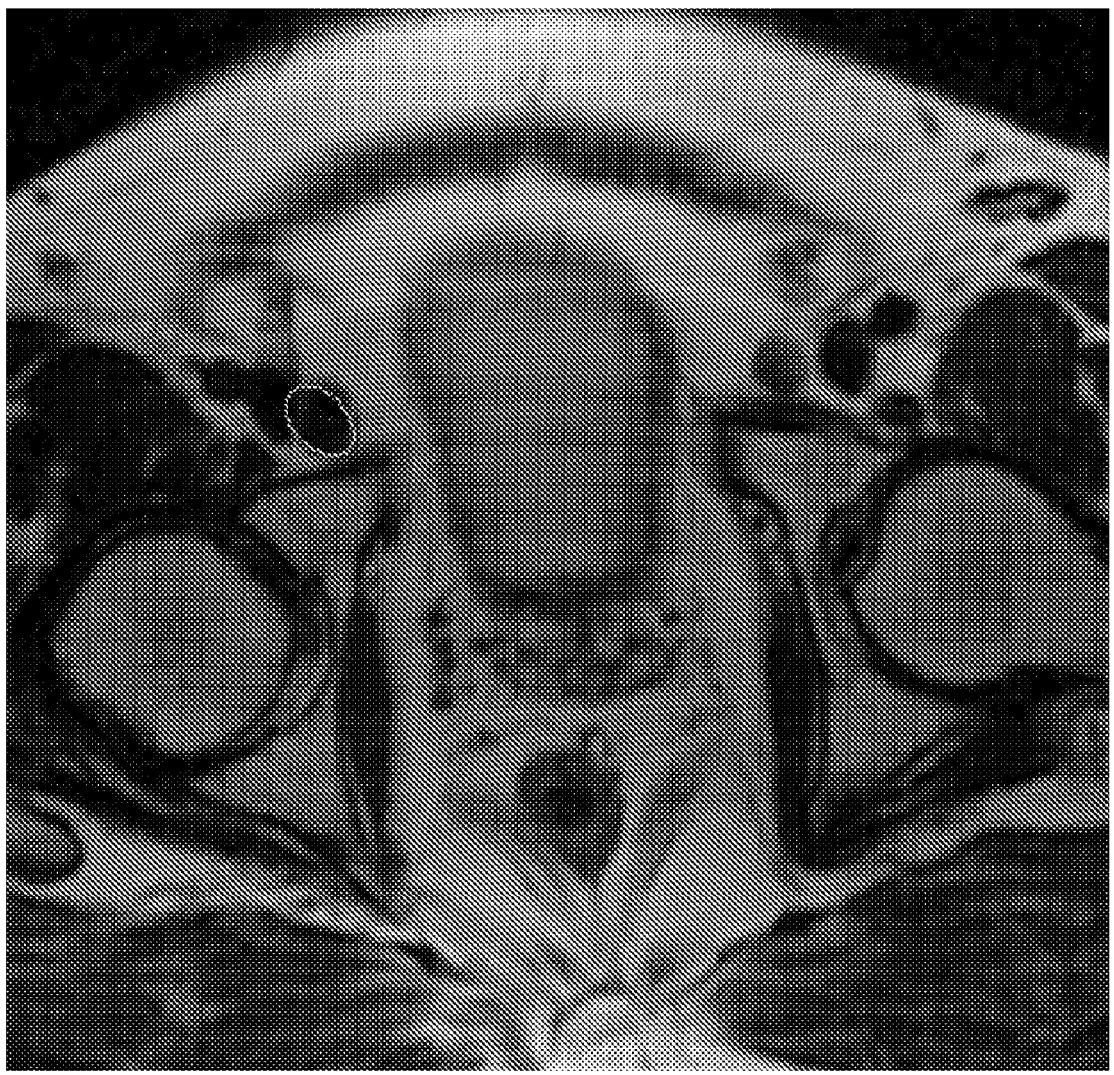
FIG. 5A is an exemplary image.
Figure 5B:
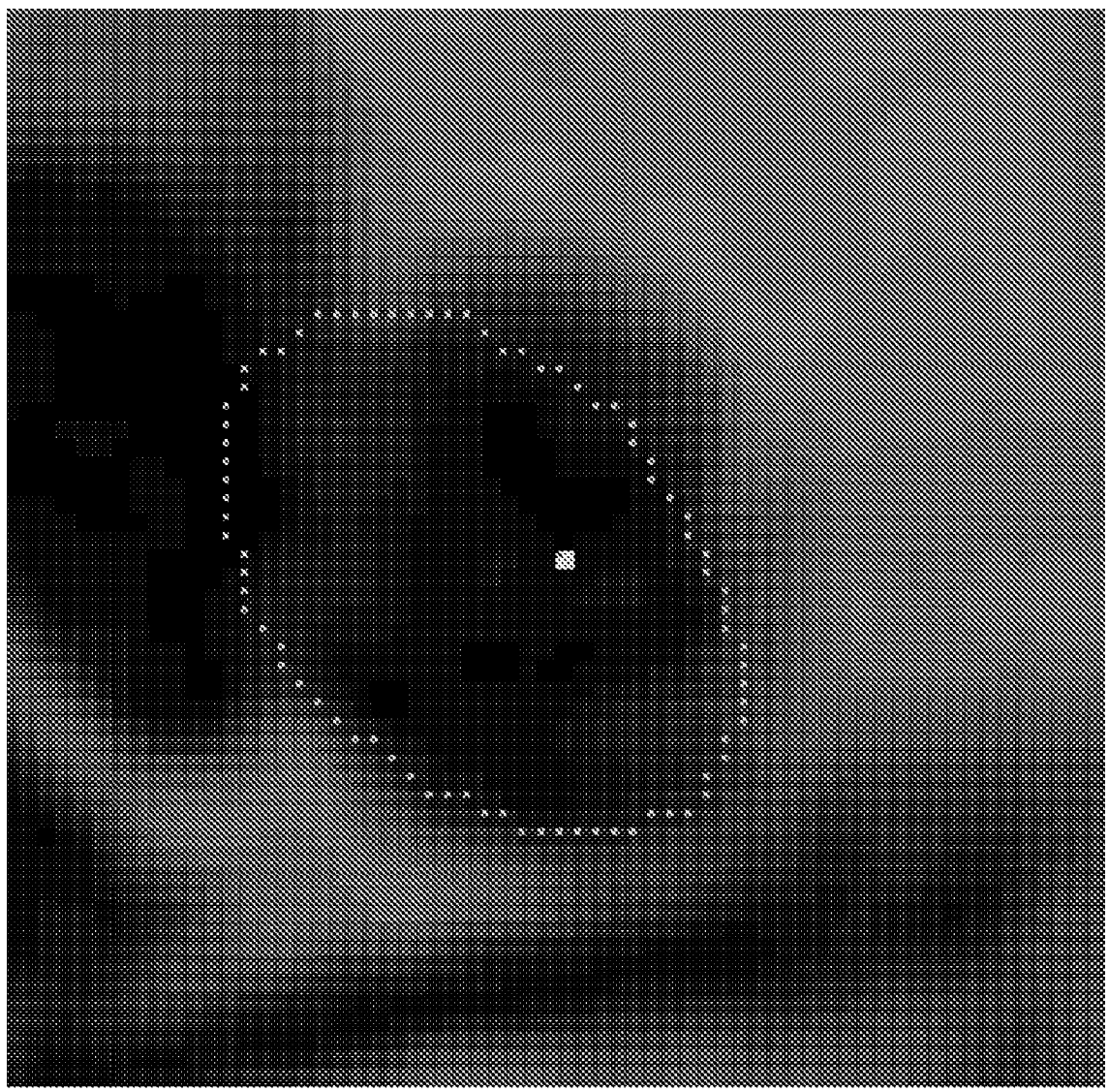
FIG. 5B is an amplification of the exemplary ellipse iteration from FIG. 5A.

FIG. 5A is an exemplary image illustrating an ellipse iteration in a magnetic resonance image at 100 iteration time intervals. FIG. 5B is an amplification of the exemplary ellipse iteration from FIG. 5A.

Figure 5C:
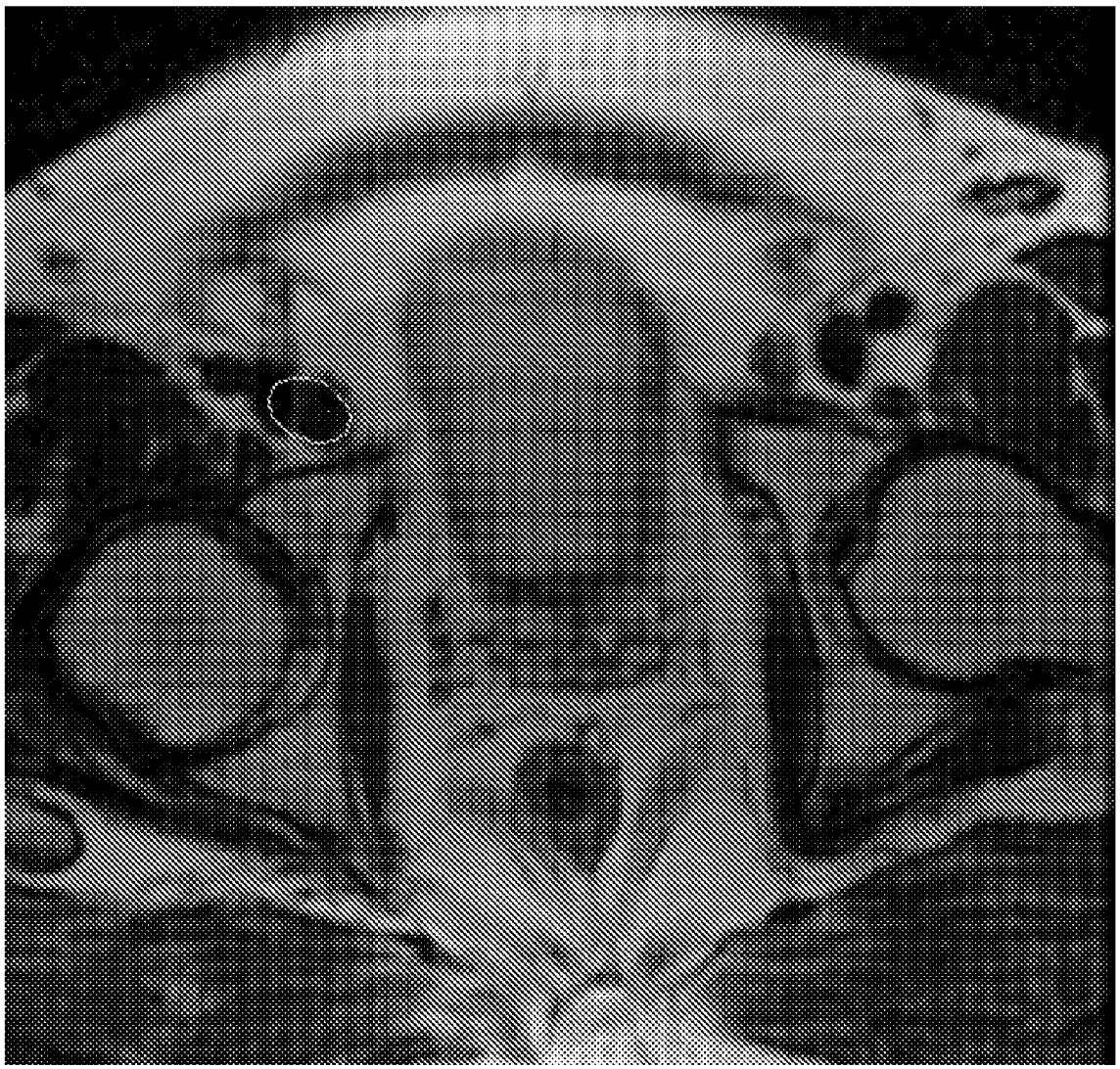
FIG. 5C is an exemplary image.
Figure 5D:
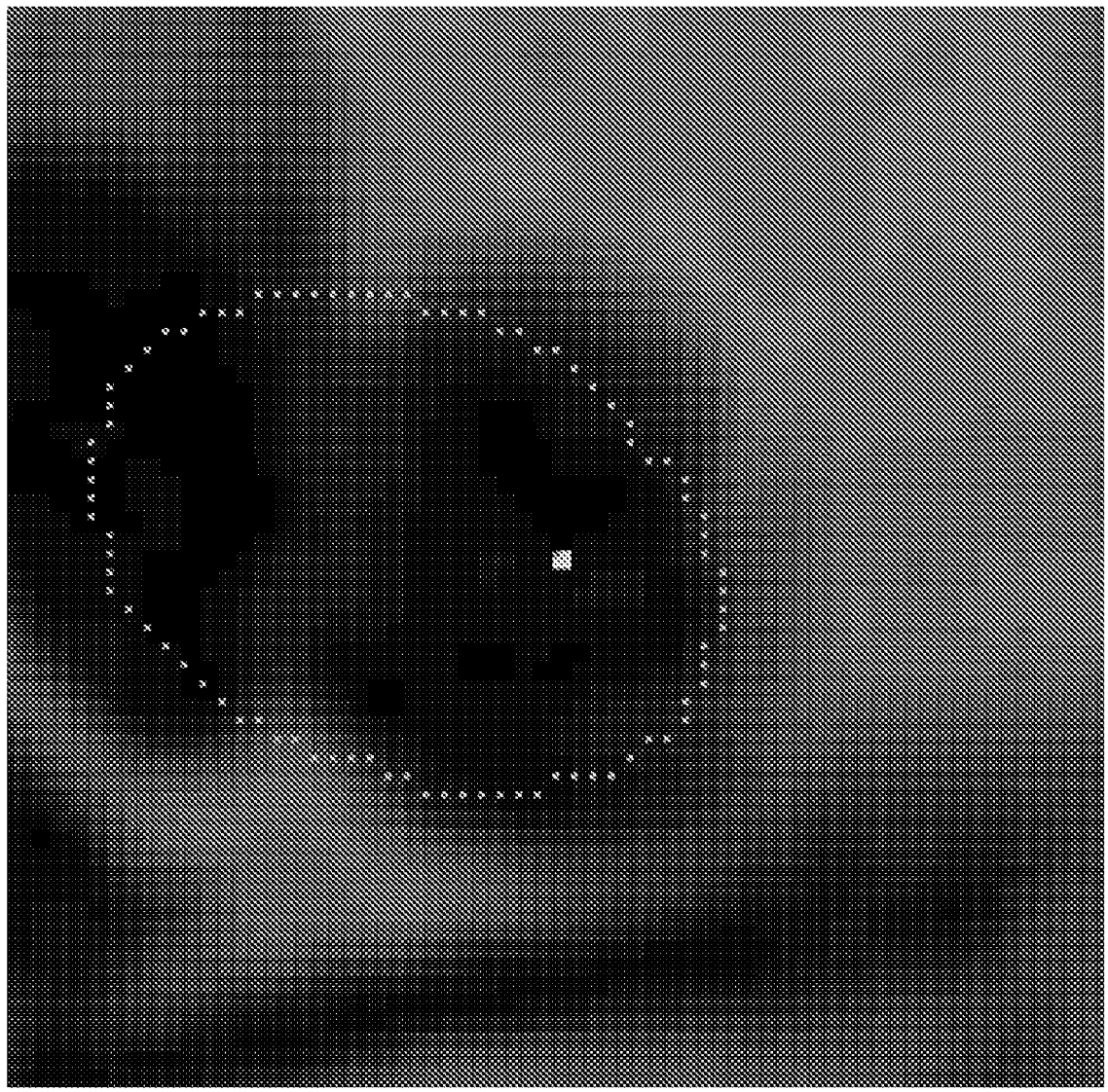
FIG. 5D is an amplification of the exemplary ellipse iteration from FIG. 5C.

FIG. 5C is an exemplary image illustrating an ellipse iteration in a magnetic resonance image at 250 iteration time intervals. FIG. 5D is an amplification of the exemplary ellipse iteration from FIG. 5C.

Figure 5E:
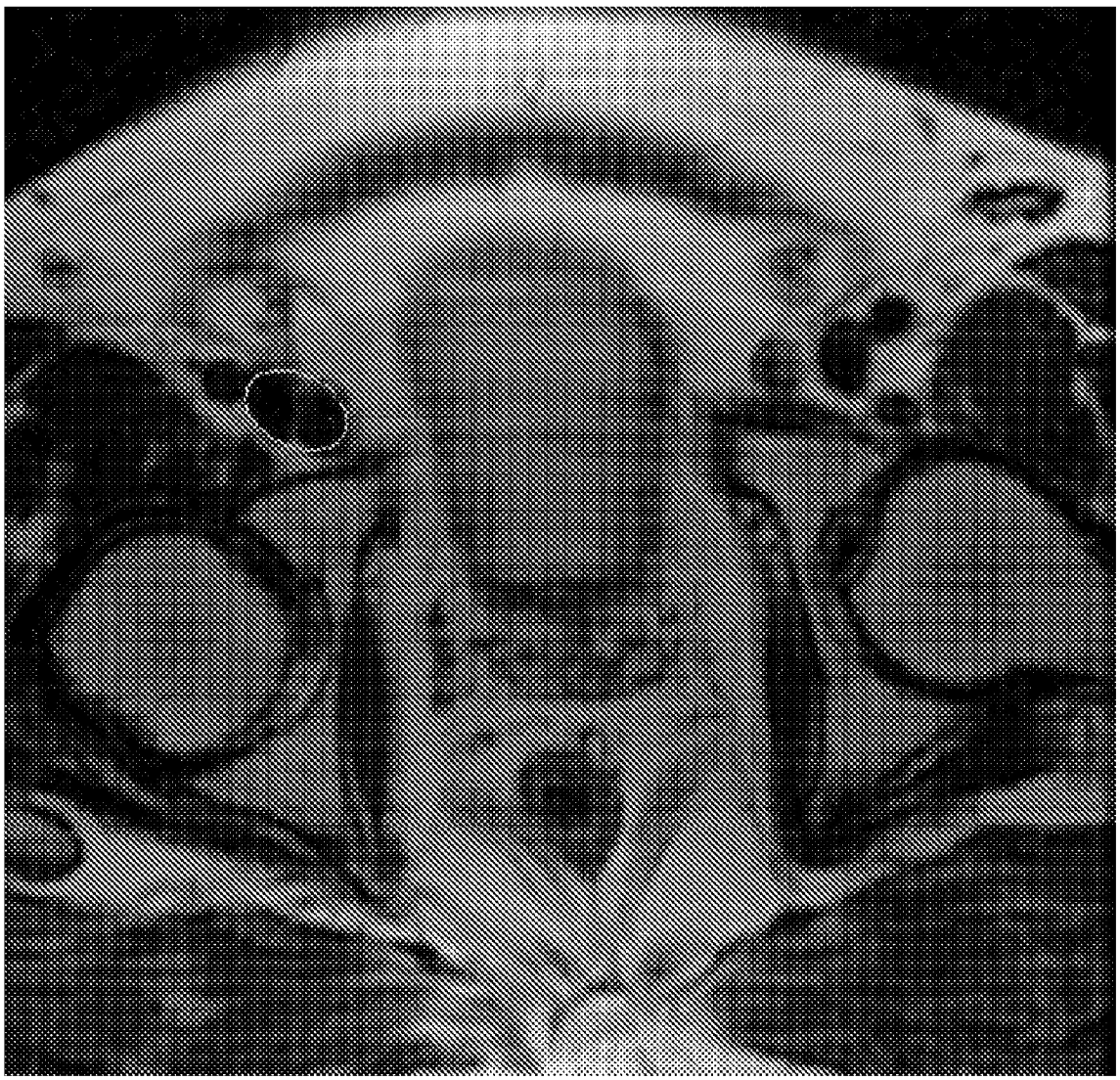
FIG. 5E is an exemplary image.
Figure 5F:
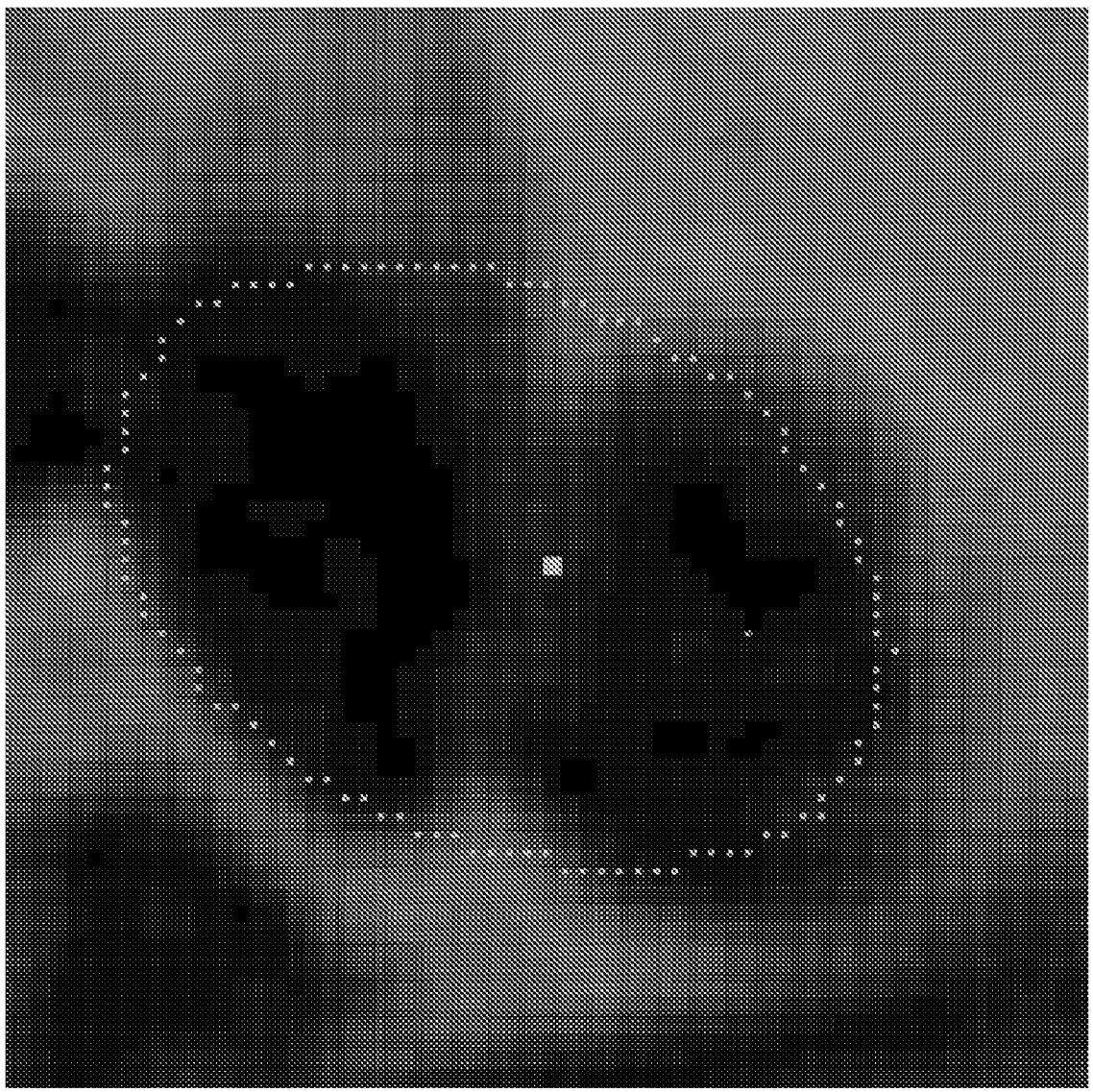
FIG. 5F is an amplification of the exemplary ellipse iteration from FIG. 5E.

FIG. 5E is an exemplary image illustrating an ellipse iteration in a magnetic resonance image at 1000 iteration time intervals. FIG. 5F is an amplification of the exemplary ellipse iteration from FIG. 5E. The illustrated progression of ellipse iteration can result in a simple mean statistic as an image descriptor separating an ellipse inside region from an outside region. In certain exemplary embodiments, the ellipse can leak to nearby structures and/or background clutter (here blood vessels).

The variogram flow ($\alpha_1=1$, $\alpha_2=0$ in equation 9) shown in FIGS. 6A, 6B, 6C, 6D, 6E, and 6F appears to stay more on the target structure, here the lymph node, because the exemplary method used gets stuck in a local minima with incorporation of spatial statistical features through the "pseudo-variogram" and at the same time trying to fit to the model variogram of a piece-wise constant region.

Figure 6A:
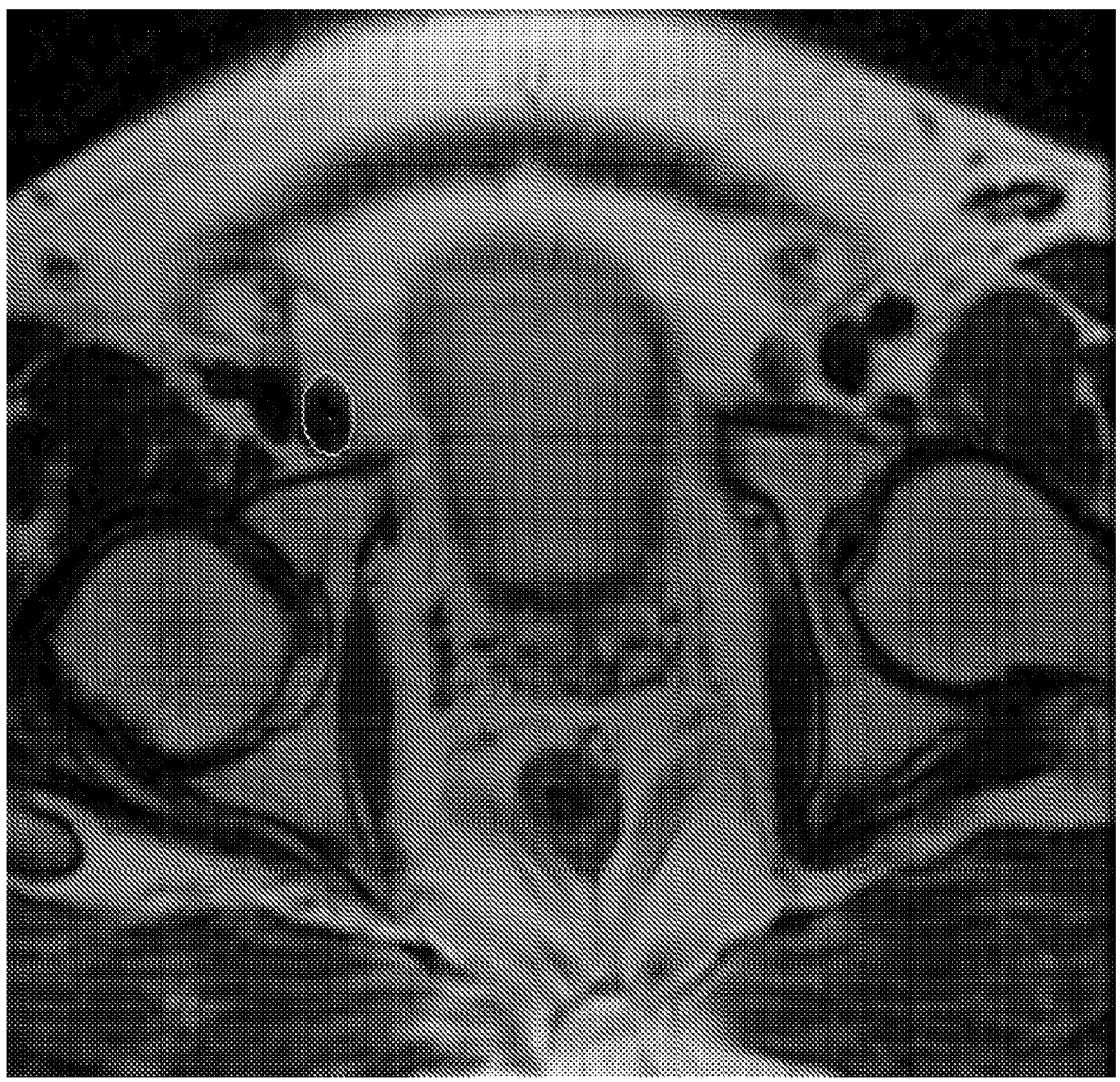
FIG. 6A is an exemplary image.
Figure 6B:
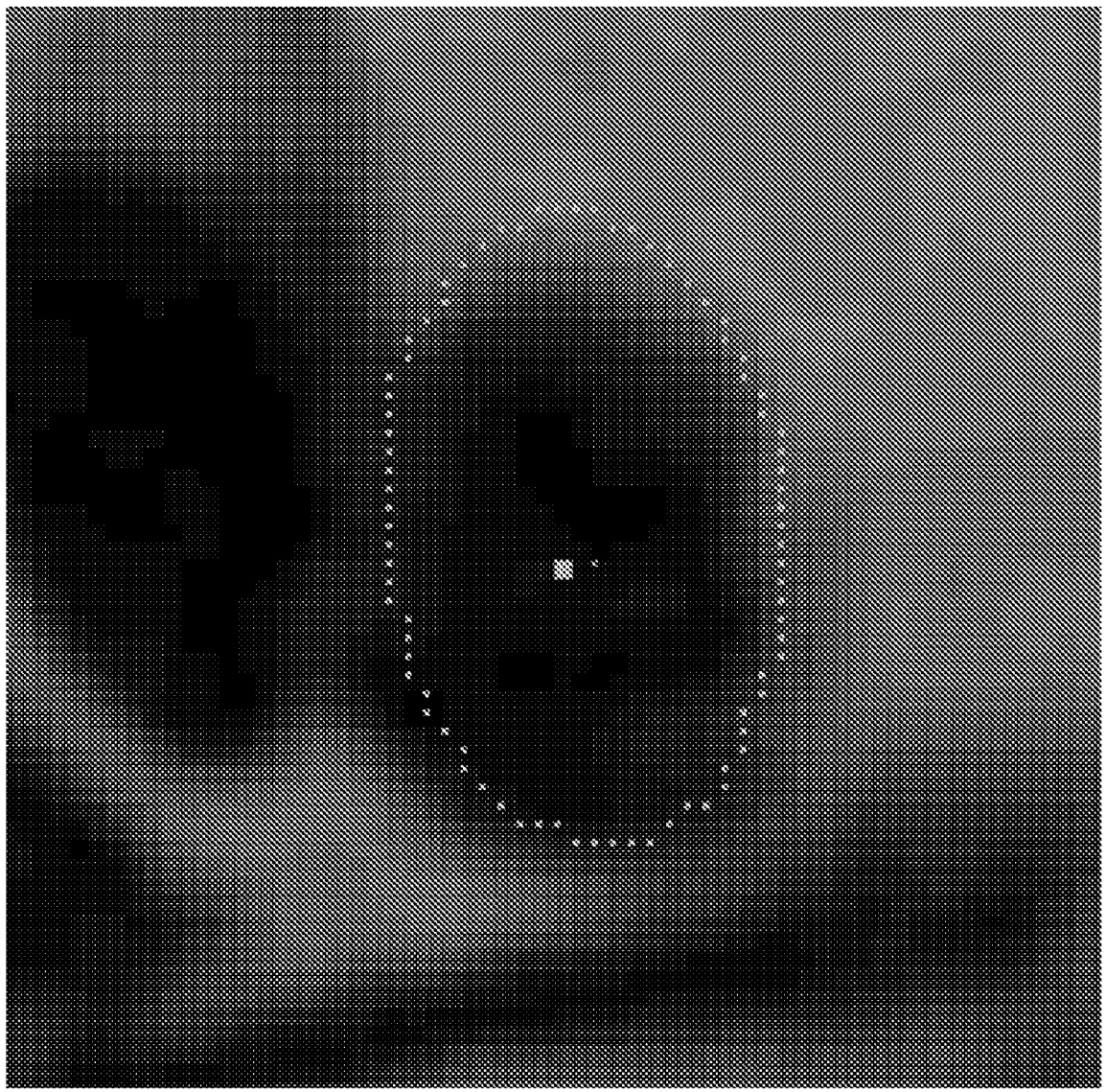
FIG. 6B is an amplification of the exemplary ellipse iteration from FIG. 6A.

FIG. 6A is an exemplary image illustrating an ellipse iteration in a magnetic resonance image at 1 iteration time intervals. FIG. 6B is an amplification of the exemplary ellipse iteration from FIG. 6A.

Figure 6C:
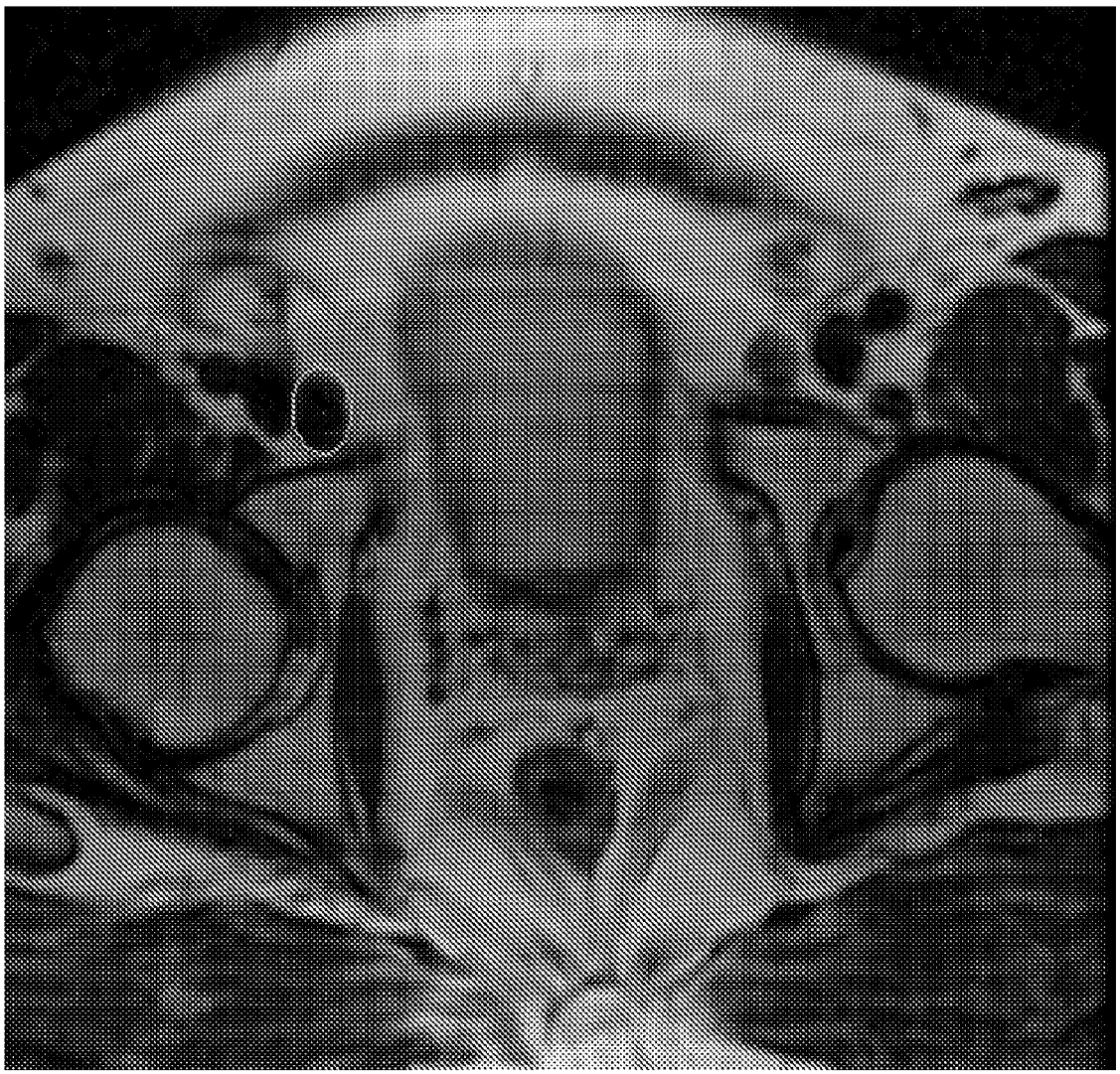
FIG. 6C is an exemplary image.
Figure 6D:
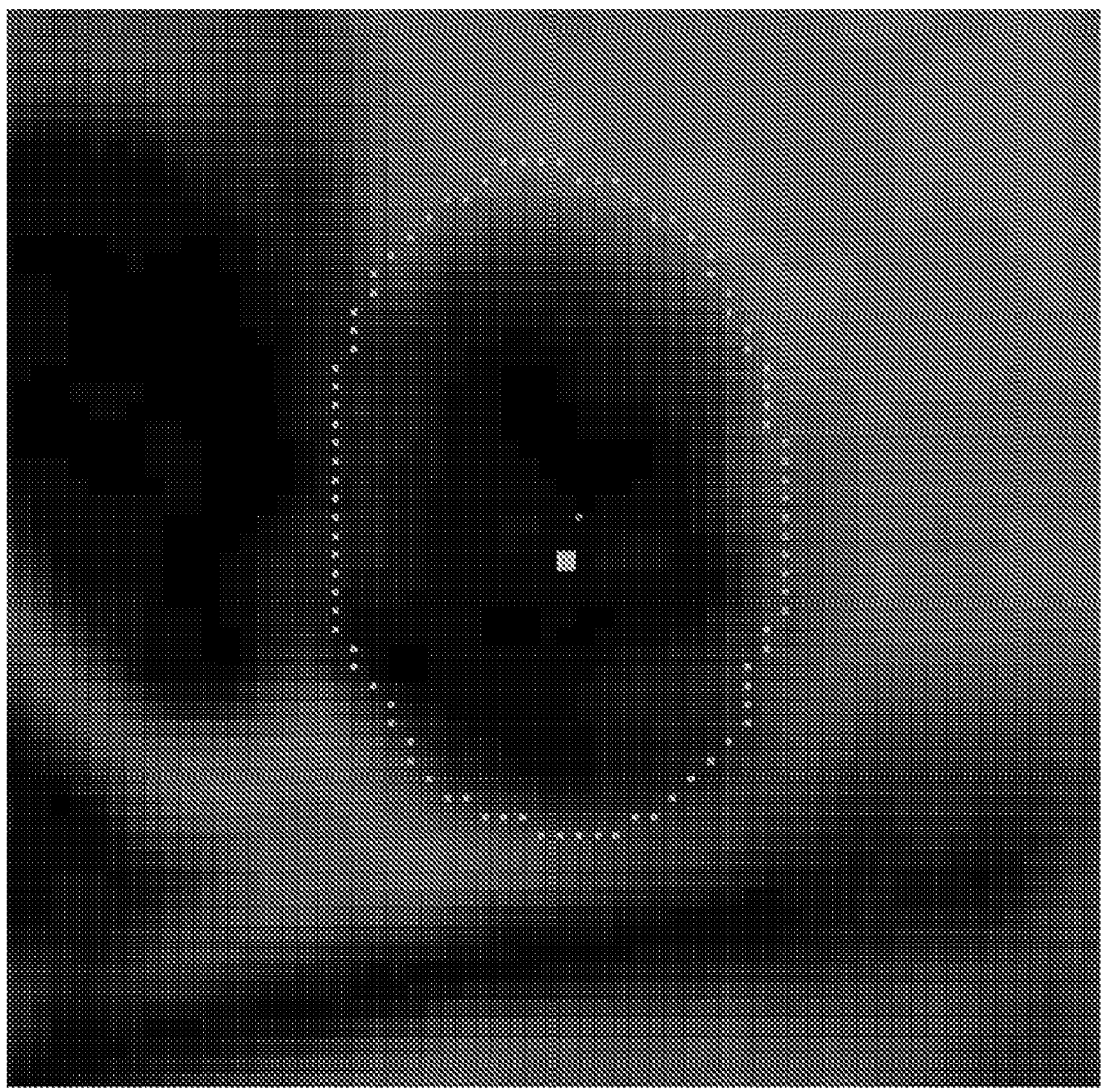
FIG. 6D is an amplification of the exemplary ellipse iteration from FIG. 6C.

FIG. 6C is an exemplary image illustrating an ellipse iteration in a magnetic resonance image at 250 iteration time intervals. FIG. 6D is an amplification of the exemplary ellipse iteration from FIG. 6C.

Figure 6E:
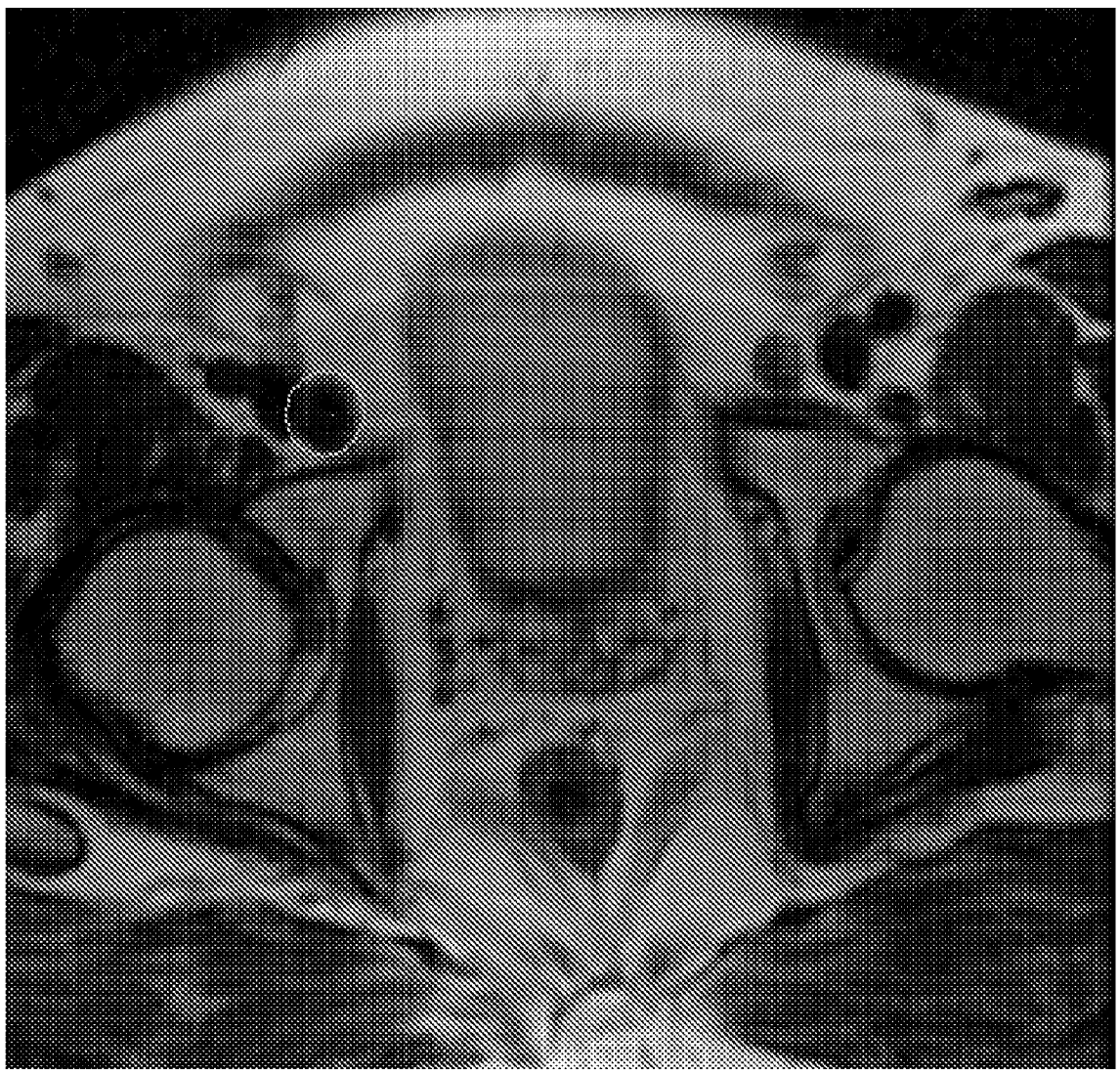
FIG. 6E is an exemplary image.
Figure 6F:
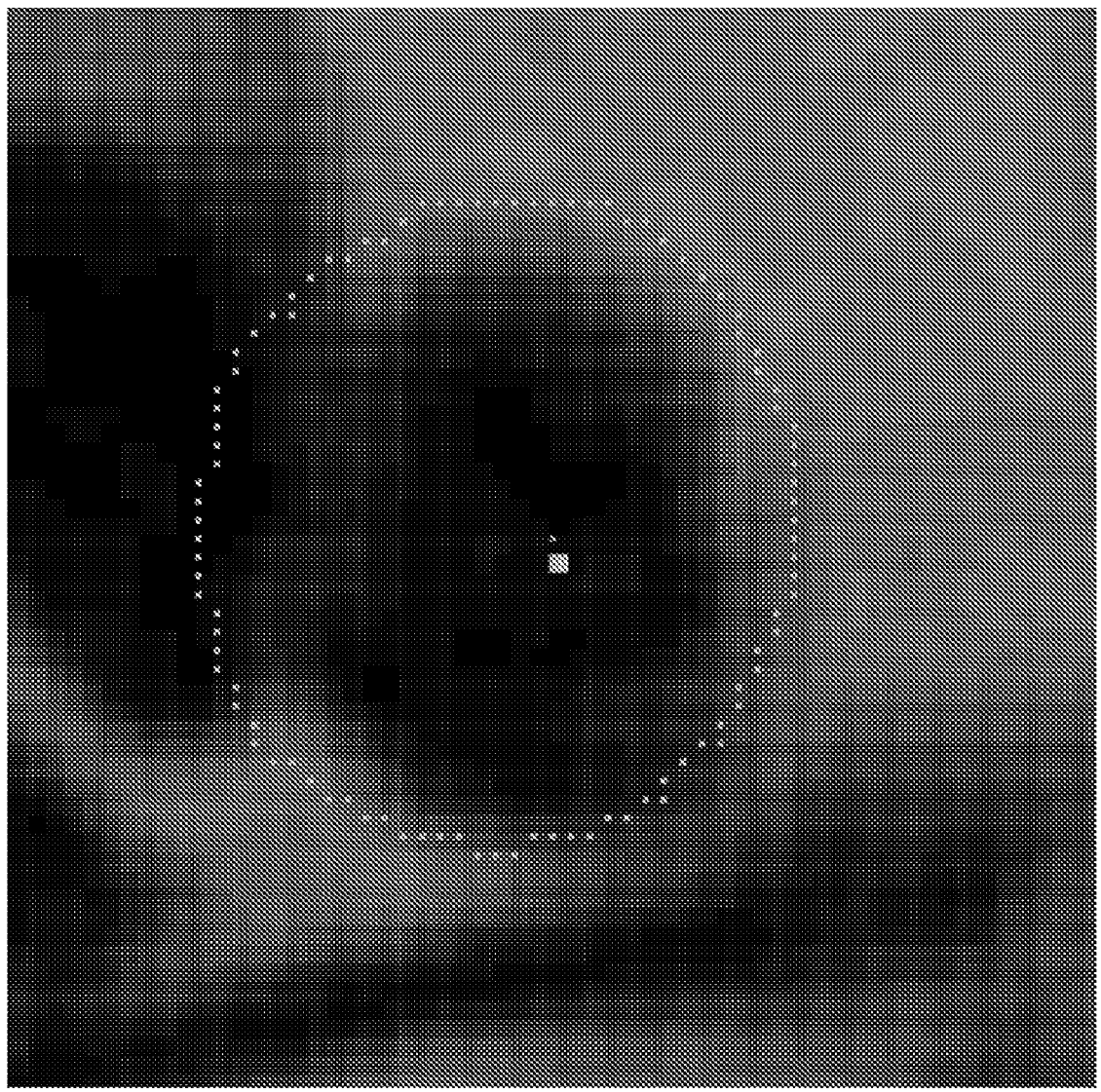
FIG. 6F is an amplification of the exemplary ellipse iteration from FIG. 6E.

FIG. 6E is an exemplary image illustrating an ellipse iteration in a magnetic resonance image at 1000 iteration time intervals. FIG. 6F is an amplification of the exemplary ellipse iteration from FIG. 6E. The illustrated progression of ellipse iteration can result in a variogram-like-statistic as an image descriptor separating an ellipse inside region from an outside region. In certain exemplary embodiments, the ellipse might not leak to nearby structures and background clutter, and can remain on a piecewise continuous intensity structure, such as the lymph node of FIGS. 6A, 6B, 6C, 6D, 6E, and 6F.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

according—as reported or stated by.

activity—an action, act, deed, function, step, and/or process and/or a portion thereof.

adapted to—made suitable or fit for a specific use or situation.

along—over a length or direction of.

and/or—either in conjunction with or in alternative to.

apparatus—an appliance or device for a particular purpose.

application—the act of putting something to a use and/or purpose; and/or a set of computer-readable instructions and/or a computer program.

approximate—nearly the same as.

are—to exist.

around—on one or more sides.

assigned—designated.

associate—to join, connect together, and/or relate.

associated with—related to.

at—in, on, and/or near.

at least—not less than.

automatically—acting and/or operating in a manner essentially independent of external human influence and/or control. For example, an automatic light switch can turn on upon "seeing" a person in its view, without the person manually operating the light switch.

band—a boundary surrounding an interior region.

based upon—determined in consideration of and/or derived from.

between—in a separating interval and/or intermediate to.

calculate—to compute.

can—is capable of, in at least some embodiments.

cause—to produce an effect.

center—a point that is substantially equally distant from the outer boundaries of something.

central—situated at, in, or near the center of a length.

compare—to examine in order to note similarities or differences between at least two items.

comparison—an examination in order to note similarities and/or differences in relation to something else.

complete—finished.

comprised by—included by.

comprising—including but not limited to.

configure—to make suitable or fit for a specific use or situation.

contour—an edge that defines an object.

convert—to transform, adapt, and/or change.

coordinate—one or more values used to determine the position of a point, line, curve, or plane in a space of a given dimension with respect to a system of lines or other fixed references.

create—to bring into being.

data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the meaning, relationship, outline, form, and/or structure of; and/or to precisely and/or distinctly describe and/or specify.

derivative—a ratio of change in a function to a corresponding change in an independent variable comprised by the function.

descriptor—an expression adapted to describe one or more characteristics of a predetermined state space.

determine—to obtain, calculate, decide, deduce, and/or ascertain.

device—an instrumentality adapted to a particular purpose.

direction—a spatial relation between something and a course along which it points and/or moves; a distance independent relationship between two points in space that specifies the position of either with respect to the other; and/or a relationship by which the alignment and/or orientation of any position with respect to any other position is established.

distance—a measure of physical and/or logical separation.

each—every one of a group considered individually.

energy function—a mathematical representation of a closeness of fit of an entity to a model.

enhance—to improve or make better.

equation—a statement asserting the equality of two expressions, usually written as a linear array of symbols that are separated into left and right sides and joined by an equal sign.

estimate—to calculate and/or determine approximately and/or tentatively, evaluate—to determine a value.

for—with a purpose of.

form—to construct.

form—used to indicate a source.

further—in addition.

generate—to create, produce, give rise to, and/or bring into existence.

geometric—of or pertaining to rectilinear and/or curvilinear lines and/or figures.

gradient—a rate of change with respect to distance of a variable quantity.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

identification—evidence of identity, such as a moniker, description, designation, and/or characteristics, and/or something that uniquely and/or substantially uniquely identifies a person and/or thing.

image—an at least two-dimensional representation of an entity and/or phenomenon.

indicative—serving to indicate.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initial—at a beginning.

initialize—to prepare something for use and/or some future event.

inner product—a mathematical operation that calculates a real-valued scalar quantity based upon two vectors, a and b, according to an equation:

$$a \cdot b = \sum_{i=1}^{n} a_i b_i = a_1 b_1 + a_2 b_2 + \cdots + a_n b_n.$$

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

inside—within a determined boundary, intensity—a strength and/or brightness of a voxel.

iteration—a repetition.

iterative—repeatedly.

location—a place.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

magnetic resonance image device—an apparatus adapted to detect absorption and transmission of high-frequency radio waves by water molecules in objects and/or tissues placed in a strong magnetic field.

mathematical representation—an arithmetic characterization of something.

maximum—a greatest extent.

may—is allowed and/or permitted to, in at least some embodiments.

mean—average; a value obtained by dividing the sum of a set of quantities by the number of quantities in a set.

measured—determined, as a dimension, quantification, and/or capacity, etc. by observation.

medical image—an image of a medical condition or medically-related data. Can be obtained via, for example, ultrasonography, radiography, magnetic resonance imaging, positron emission tomography, computed tomography, etc.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

minimization algorithm—a method adapted to adjust a variable and/or parameter to an approximate lowest level.

model—a mathematical and/or schematic description of an entity and/or system.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

object—a physical thing; an item associated with a radio frequency identification tag; a grouping of data and/or executable instructions; and/or a discrete graphical item that can be selected and maneuvered, such as an onscreen graphic.

obtain—to receive, get, take possession of, procure, acquire, calculate, determine, and/or compute.

one—a singular item.

over—with reference to.

packet—a discrete instance of communication.

parameter—a sensed, measured, and/or calculated value.

patient—a human or other type of animal under supervision for health care purposes.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to indicate a position and/or direction of.

portion—a part, component, section, percentage, ratio, and/or quantity that is less than a larger whole. Can be visually, physically, and/or virtually distinguishable and/or non-distinguishable.

predetermined—established in advance.

prior—earlier in time.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

radius—a distance from an approximate center of an object to a curved boundary of the object.

receive—to get as a signal, take, acquire, and/or obtain.

recommend—to suggest, praise, commend, and/or endorse.

region—a continuous part of a surface.

related—connected to and/or associated with.

render—to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

repeatedly—again and again; repetitively.

request—to express a desire for and/or ask for.

said—when used in a system or device claim, an article indicating a subsequent claim term that has been previously introduced.

select—to make a choice or selection from alternatives.

selection—(v.) the act of choosing and/or selecting and/or an assortment of things from which a choice can be made. (n.) a choice.

set—a related plurality.

shape—a characteristic surface, outline, and/or contour of an entity.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

specific—peculiar to something.

specify—to describe, characterize, indicate, and/or state explicitly and/or in detail.

store—to place, hold, and/or retain data, typically in a memory.

substantially—to a great extent or degree.

system—a collection of mechanisms, devices, data, and/or instructions, the collection designed to perform one or more specific functions.

tangent—a line or a plane that touches a curve or a surface at a point so that the line or plane is closer to the curve in the vicinity of the point than any other line or plane drawn through the point; and/or adjacent.

target—a destination.

that—a pronoun used to indicate a thing as indicated, mentioned before, present, and/or well known.

three dimensional—definable via coordinates relative to three mutually perpendicular axes.

to—a preposition adapted for use for expressing purpose.

transmit—to send as a signal, provide, furnish, and/or supply.

two dimensional—definable via coordinates relative to two perpendicular axes.

uniform—relatively homogenous.

unit normal vector—a vector having a magnitude of one and a direction perpendicular to a predetermined line and/or surface.

update—to change.

user—a person, organization, process, device, program, protocol, and/or system that uses a device, system, process, and/or service.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

value—a measured, assigned, determined, and/or calculated quantity or quality for a variable and/or parameter.

variable—(n) a property, parameter, and/or characteristic capable of assuming any of an associated set of values. (adj) likely to change and/or vary; subject to variation; and/or changeable.

variogram statistic—a calculated value indicative of a measure of difference between voxel intensities as a function of distance.

vector—an expression characterized by a magnitude and a direction.

via—by way of and/or utilizing.

weight—a value indicative of importance.

where—in a situation or position.

wherein—in regard to which; and; and/or in addition to.

which—a pronoun adapted to be used in clauses to represent a specified antecedent.

What is claimed is:

1. A method comprising:
obtaining data from a magnetic resonance image device;
rendering an initial image based upon said data;
receiving a user selection indicative of an approximate central point of a target object comprised by said initial image;
automatically determining an initial mathematical representation of said target object based upon said data, said initial mathematical representation of said target object comprising an initial contour, said initial contour based upon said approximate central point of said target object;
automatically determining an updated contour of said target object based upon an application of an iterative minimization algorithm to an energy function, said energy function based upon a variogram statistic calculated from said data from said magnetic resonance image device, each iteration of said iterative minimization algorithm comprising a comparison of model variogram with an estimated variogram associated with said updated contour of said target object, said estimated variogram determined via a derivative of said energy function evaluated at a contour associated with a prior variogram model of said target object;
automatically rendering said updated contour of said target object;
said variogram statistic determined according to an equation:

$$\gamma(h) = \frac{\int_{C^{r,\theta}} (I(X) - I(X+h))^2 \, dp}{\int_{C^{r,\theta}} dp}$$

where:
γ is said variogram statistic;
h is a direction vector;
$C^{r,\theta}$ is said contour associated with said prior variogram model;
r is a specific band radius related to said contour;
θ is a direction of vector h,
X is an image coordinate vector;
p is a coordinate variable on said contour; and
I is a measured image intensity at a specified location.

2. A method comprising:
automatically determining a renderable updated contour of a target object from an image, said updated contour determined via an application of an iterative minimization algorithm to an energy function, said energy function based upon a variogram statistic calculated from image data obtained from a magnetic resonance image device, each iteration of said iterative minimization algorithm comprising a comparison of a model variogram with an estimated variogram associated with said updated contour of said target object, said estimated variogram determined via a derivative of said energy function evaluated at a contour associated with a prior variogram model of said target object, said variogram statistic determined according to an equation:

$$\gamma(h) = \frac{\int_{C^{r,\theta}} (I(X) - I(X+h))^2 \, dp}{\int_{C^{r,\theta}} dp}$$

where:
γ is said variogram statistic;
h is a direction vector;
$C^{r,\theta}$ is said contour associated with said prior variogram model;
r is a specific band radius related to said contour;
θ is a direction of vector h;
X is an image coordinate vector;
p is a coordinate variable on said contour; and
I is a measured image intensity at a specified location.

3. The method of claim 2, further comprising:
obtaining said data from said magnetic resonance image device.

4. The method of claim 2, further comprising:
receiving a user selection of an approximate center point of said target object, said contour determined based upon said approximate center point of said target object.

5. The method of claim 2, further comprising:
receiving a user identification of said target object, said contour determined based upon said user identification of said target object.

6. The method of claim 2, further comprising:
determining said model variogram.

7. The method of claim 2, further comprising:
determining an initial contour of said target object.

8. The method of claim 2, further comprising:
determining an initial contour of said target object based upon a selection of a model of said object.

9. The method of claim 2, further comprising:
determining an initial contour of said target object, wherein said initial contour is a mathematical model of a geometric shape.

10. The method of claim 2, further comprising:
comparing image intensity values along said updated contour of said target object to a mean image intensity of a portion of said target object.

11. The method of claim 2, further comprising:
determining said variogram statistic.

12. The method of claim 2, further comprising:
determining a mean image intensity of a portion of said target object, said iterative minimization algorithm adapted to utilize said mean image intensity.

13. The method of claim 2, wherein said energy function is:

$$E(\lambda) = \alpha_1 \int_0^{2\pi} \int_0^R \left[ \frac{\int_{\varepsilon^{r-\theta}} (I(X) - I(X+h))^2 dp}{\int_{\varepsilon^{r,\theta}} dp} - \gamma^*(h) \right]^2 dr d\theta + \alpha_2 \int_{\varepsilon_{in}} f(X) dX$$

where:
E($\lambda$) is said energy function;
$\lambda$ is a parameter of at least one of a prior geometric model;
$\alpha_1$, and $\alpha_2$ are assigned weights;
R is a maximum distance over which said energy function is evaluated, which is related to said contour;
$\gamma^*(h)$ is a model variogram statistic at a selected point at a point on said contour;
h is a direction vector;
r is a specific band radius related to said contour;
$\theta$ is a direction of vector h;
X is an image coordinate vector;
p is a coordinate variable on said contour;
I is a measured image intensity at a specified location;
$\epsilon$ is said contour having parameters $\lambda$;
f($\chi$) is a region descriptor; and
$\epsilon_{in}$ is a region inside of said contour.

14. The method of claim 2, wherein said derivative of said energy function is:

$$\frac{\partial \lambda^j}{\partial t} = \int_0^{2\pi} \int_0^R (\gamma(h) - \gamma^*(h))$$

$$\left[ \frac{\int_{\varepsilon^h} \left\langle 2(I(x) - I(x+h))(\nabla I(x) - \nabla I(x+h)), \frac{\partial x}{\partial X^j} \right\rangle dp}{\int_{\varepsilon^h} dp} - \right.$$

-continued $$\left. \gamma(h) \frac{\int_{\varepsilon^h} \left\langle \frac{\partial x}{\partial \lambda^j}, T_p \right\rangle dp}{\int_{\varepsilon^h} dp} \right] dh + \alpha_2 \int_\epsilon f(x,y) \left\langle \frac{\partial x}{\partial \lambda^j}, N \right\rangle dp$$

where:
$\lambda^j$ is a parameter of said contour;
R is a maximum distance over which said energy function is evaluated, which is related to said contour;
$\gamma$ is said variogram statistic;
h is a direction vector;
$\gamma^*(h)$ is a model variogram statistic at a selected point at a point on said contour;
$\epsilon^h$ is a contour at a specific distance band of said contour;
I is a measured image intensity at a specified location;
X is an image coordinate vector;
$\nabla$ is a gradient symbol;
p is a coordinate variable on said contour;
f($\chi$,y) is a region descriptor of said contour; and
T (p) is a tangent vector to said contour;
$T_p$ is a derivative of T(p);

$$\left\langle \frac{\partial x}{\partial \lambda^j}, N \right\rangle$$

is an inner product between two vectors, $$\frac{\partial x}{\partial \lambda}$$

and N; and
N is a unit normal vector of said contour.

15. The method of claim 2, further comprising:
determining that said minimization algorithm has completed.

16. The method of claim 2, wherein said target object is a two dimensional target object.

17. The method of claim 2, wherein said target object is a three dimensional target object.

18. The method of claim 2, wherein said target object is from a medical image obtained from a patient.

19. A non-transitory machine-readable medium comprising machine computer implementable instructions for activities comprising:
automatically determining an updated contour of a target object from an image, said updated contour determined via an application of an iterative minimization algorithm to an energy function, said energy function based upon a variogram statistic calculated from image data obtained from a magnetic resonance image device, each iteration of said iterative minimization algorithm comprising a comparison of a model variogram with an estimated variogram associated with said updated contour of said target object, said estimated variogram determined via a derivative of said energy function evaluated at a contour associated with a prior variogram model of said target object, said variogram statistic determined according to an equation:

$$\gamma(h) = \frac{\int_{C^{r,\theta}} (I(X) - (I(X-h))^2 \, dp}{\int_{c^{r,\theta}} dp}$$

where:
γ is said variogram statistic;
h is a direction vector;
$C^{r,\theta}$ is said contour associated with said prior variogram model;
r is a specific band radius related to said contour;
θ is a direction of vector h;
X is an image coordinate vector;
p is a coordinate variable on said contour; and
I is a measured image intensity at a specified location.

20. A system comprising:
a processor adapted for determining an updated contour of a target object from an image, said updated contour determined via an application of an iterative minimization algorithm to an energy function, said energy function based upon a variogram statistic calculated from image data obtained from a magnetic resonance image device, each iteration of said iterative minimization algorithm comprising a comparison of a model variogram with an estimated variogram associated with said updated contour of said target object, said estimated variogram determined via a derivative of said energy function evaluated at a contour associated with a prior variogram model of said target object; and a user interface adapted to render said updated contour, said variogram statistic determined according to an equation:

$$\gamma(h) = \frac{\int_{C^{r,\theta}} (I(X) - I(X+h))^2 \, dp}{\int_{C^{r,\theta}} dp}$$

where:
γ is said variogram statistic;
h is a direction vector;
$C^{r,\theta}$ is said contour associated with said prior variogram model;
r is a specific band radius related to said contour;
θ is a direction of vector h;
X is an image coordinate vector;
p is a coordinate variable on said contour; and
I is a measured image intensity at a specified location.

* * * * *